United States Patent Office 3,158,487
Patented Nov. 24, 1964

3,158,487
EMULSIFIER AND METHOD OF MAKING SAME
Edward J. Reid, Dumont, N.J., assignor to Lever Brothers Company, New York, N.Y., a corporation of Maine
No Drawing. Filed Mar. 28, 1961, Ser. No. 98,775
8 Claims. (Cl. 99—94)

This invention relates to lactic acid emulsifiers and more particularly to lactylated mixed esters suitable for use as shortening ingredients.

In recent years, it has been proposed to prepare emulsifiers by reacting lactic acid with mono-diglyceride concentrates. These emulsifiers, such as glyceryl lacto palmitate and glyceryl lacto stearate, have been found useful as shortening additives and as cake mix emulsifiers.

In accordance with the present invention, it has been found that improved emulsifiers can be prepared by reacting lactic acid with a mixture of the higher fatty acid esters of glycerol and the higher fatty acid esters of propylene glycol.

One advantage to the present invention is in the use of lactylated emulsifiers prepared by a more economical method than that utilized to prepare other commercially available lactylated emulsifiers.

Another advantage of the invention is in the discovery that these lactylated mixed higher fatty acid esters of glycerol and propylene glycol are particularly effective in preparing cake mixes which are low in shortening and contain a high proportion of liquids.

The lactylated mixed esters of this invention may be prepared by a number of different methods. A preferred method includes the steps of reacting fatty acid triglycerides such as those derived from vegetable oils with a mixture of glycerol and propylene glycol at temperatures of about 205°–215° C. for 1 hour in the presence of an esterification catalyst. The catalyst is then neutralized and the excess polyhydric alcohol is removed by vacuum distillation with steam. An average mixed partial ester prepared by this method contains the following ingredients:

| | Percent |
|---|---|
| Glyceryl monoester | 22.4 |
| Glyceryl diester | 21.8 |
| Glyceryl triester | 5.8 |
| Propylene glycol monoester | 33.4 |
| Propylene glycol diester | 16.6 |
| | 100.0 |

The mixed partial esters are then heated to 160°–165° C. and lactic acid is slowly added to esterify (lactylate) at least some of the free hydroxyl groups in the mixed esters. The water evolved is removed from the reaction by a stream of inert gas, and the lactylated product is filtered and washed with hot water. The color of the product is improved if a small amount of activated carbon is present during the lactic acid esterification. The slow addition of lactic acid minimizes the formation of lactic acid polymers during the reaction.

In the event complete lactylation is desired, it would be advantageous to use an amount of lactic acid about 10% in excess of the amount theoretically required to esterify all hydroxyl groups. It should be realized that complete lactylation is not necessary to produce effective emulsifiers. A product which is about 80% lactylated, for example, still has the ability to perform in a satisfactory manner as an emulsifying agent.

The mixed fatty acid esters of glycerol and propylene glycol contain free hydroxyl radicals as the only groups available for reaction with lactic acid and esterification occurs between the hydroxyl radicals of the esters and the carboxyl group of the lactic acid. Since the hydroxyl radical of the lactic acid does not enter into the lactylation reaction to any substantial degree, the esters of the invention are characterized by the presence of free hydroxyl groups derived from the lactic acid reactant, i.e., the hydroxyl groups of the lactic acid residues in the mixture are substantially unesterified.

The triglycerides used in the ester interchange with propylene glycol and glycerol may be derived from any animal or vegetable source. This includes unsaturated fatty acids as well as the saturated higher fatty acids obtained by partial or complete hydrogenation of soybean oil, coconut oil, cottonseed oil, etc.

While it is desirable that at least 10% of the lactylated esters be lactylated propylene glycol monoester, it appears doubtful that this percentage would exceed 90% when triglycerides are used as the fatty acid source. The proportion of polyhydric alcohol in the mixture can be widely varied as can the proportion of alcohol mixture to fatty acids. The ratios of starting materials found most effective, however, are the following:

| | By Mol Wt. | By Weight |
|---|---|---|
| Glycerol to propylene glycol | 0.7 to 1.0 | 0.847 to 1.0 |
| Polyhydric alcohol to fatty acid | 1.133 to 1.0 | 0.332 to 1.0 |

An increase in the glycerol to propylene glycol ratio would increase the amount of glycerol partial esters while a decrease in this ratio would increase the propylene glycol partial esters. Increasing the ratio of polyhydric alcohol to fatty acid would increase both the glycerol and propylene glycol monoester contents while decreasing both diester contents and the glycerol triester content. The reverse would be true if this ratio were decreased.

Instead of the step of ester interchange with fatty acid triglycerides, free fatty acids or mixtures of fatty acids derived from vegetable or animal oils may be used in direct esterification with the alcohols. Alternatively, the fatty acid esters of glycerol and propylene glycol may be separately prepared and then combined prior to reaction with lactic acid, although this is a more costly procedure.

The lactylated mixed esters of this invention find general use as emulsifiers in many diverse applications. They have been found most effective as shortening agents and emulsifiers in cake mixes, particularly those mixes having a low shortening content and a high proportion of liquid ingredients.

In the cake mix type shortening, the lactylated esters derived predominantly from saturated fatty acids are much more effective than the esters prepared from unsaturated acids.

Furthermore, the lactylated esters may be used as the emulsifying agent in the preparation of aerosol whipped toppings or in powdered dessert toppings to replace the glycerol lacto palmitate and glyceryl lacto oleate. In the latter development, which is the subject of copending application Serial No. 150,637, filed on November 7, 1961, a combination of saturated and unsaturated fatty acids should be used to prepare a lactylated mixed ester having the most desirable properties.

In the preparation of shortenings, the lactylated mixed esters of propylene glycol and glycerol may be combined with other well-known emulsifiers including the mono-diglycerides of animal and vegetable oils and fats. As an additional advantage of this invention, it has been found that the lactylated mixed esters may be combined with the non-lactylated mixed fatty acid esters of propylene glycol and glycerol to yield a suitable shortening which compares quite favorably with mono-glycerides and other conventional shortening emulsifiers. This substitution of mixed partial esters of propylene glycol and glycerol for mono-diglycerides represents an important advantage since the mixed esters are less expensive to manufacture than the mono-diglycerides.

For best results, the lactylated emulsifier of the present invention is incorporated in shortenings at a level of about 8–16% by weight of the shortening, with the remainder being the conventional animal or vegetable fats or oils. Where the lactylated mixed esters are to be combined with mono-diglycerides or non-lactylated mixed esters, the shortening contains about 8–16% by weight of total emulsifier with the ratio of lactylated mixed ester to non-lactylated mixed ester or mono-diglyceride being about 1:3 to 3:1.

In the following examples which further illustrate the compositions of this invention, the lactylated emulsifiers were prepared as follows.

*Preparation of the mixed partial esters.*—1762 grams of soybean oil (1 I.V.), 73.5 grams of glycerol, 312 grams of propylene glycol and 1.8 grams of sodium hydroxide were charged to a reaction vessel equipped with a mechanical agitator. The mixture was heated to 205°–215° C. with agitation and held at this temperature for approximately one hour. Upon cooling the mixture to 160° C., 3.5 grams of 85% ortho phosphoric acid were added to the mixture. After stripping the mixture with steam at 160° C. for 30 minutes at a pressure of 4 mm. Hg, the mixture was cooled and filtered.

*Lactylation of the mixed partial esters.*—500 grams of the mixed partial esters prepared above were heated to 165° C. with 3 grams of activated carbon. The vessel used was equipped with mechanical agitation and nitrogen sweep, and a condenser for removing the water formed during esterification. 165 grams of 85% lactic acid were slowly (dropwise) added to the mixed esters over a two hour period. The mixture was cooled, filtered, and washed with two 60 gram portions of hot water.

EXAMPLE 1

For purposes of comparison, various emulsifiers were used in the following cake mix batter:

| | Grams |
|---|---|
| Flour | 200 |
| Sugar | 232 |
| Shortening | 73 |
| Baking powder | 10 |
| Salt | 7 |
| Non-fat milk solids | 17 |
| Whole eggs | 100 |
| Water | 236 |

The cakes were prepared as follows: The flour, sugar, non-fat milk solids, baking powder and salt were placed in a Kitchen Aid Mixer bowl. The shortening and two-thirds of the water were blended at speed "1" for 30 seconds and the mixture was beaten for 2 minutes at speed "4." The whole eggs were added to the batter and blended at speed "1" followed by beating at speed "4" for 1 minute. The remaining water was blended into the batter at speed "1" and the batter was beaten for one minute at speed "1." 410 grams of batter were scaled into each of two "8" layer pans. The cakes were baked at 350° F. for 35 minutes:

The shortening ingredients comprised a blend of 85 I.V. soybean oil and emulsifiers identified as A, B, C, and D. Mixtures of lactylated and non-lactylated emulsifiers were also used in the cake baking tests. The results in terms of cake volumes (measured in cubic centimeters) are listed in Table I. Unless otherwise noted, the cake volume was considered a good index of overall cake quality.

The shortenings were prepared by melting the emulsifying agent in the soybean oil on a steam bath, the temperature being at least 70° C. The hot liquid was quick-chilled and textured in a laboratory texturator. This equipment also occludes air in the shortening. The samples referred to in Table I contained 10% occluded air.

*Table I*

BAKING RESULTS

| Percent Total Emulsif. | Percent Lactyl. Emulsif. | Percent Regular Emulsif. | A [1] | B | C | D | A & C | B & C | B & D |
|---|---|---|---|---|---|---|---|---|---|
| 4 | 4 | -------- | 1,115 | 1,100 | -------- | -------- | -------- | -------- | -------- |
| 4 | -------- | 4 | -------- | -------- | 1,015 | 1,100 | -------- | -------- | -------- |
| 8 | 8 | -------- | 1,180 | 1,315 | -------- | -------- | -------- | -------- | -------- |
| 8 | -------- | 8 | -------- | -------- | 1,060 | 1,180 | -------- | -------- | -------- |
| 8 | 4 | 4 | -------- | -------- | -------- | -------- | 1,270 | 1,265 | 1,260 |
| 12 | 12 | -------- | [2]1,415 | 1,400 | -------- | -------- | -------- | -------- | -------- |
| 12 | -------- | 12 | -------- | -------- | 1,180 | 1,220 | -------- | -------- | -------- |
| 12 | 4 | 8 | -------- | -------- | -------- | -------- | 1,365 | 1,395 | 1,395 |
| 12 | 8 | 4 | -------- | -------- | -------- | -------- | 1,230 | 1,200 | 1,305 |
| 16 | 16 | -------- | [2]1,425 | 1,450 | -------- | -------- | -------- | -------- | -------- |
| 16 | -------- | 16 | -------- | -------- | 1,220 | 1,290 | -------- | -------- | -------- |
| 16 | 4 | 12 | -------- | -------- | -------- | -------- | 1,365 | 1,425 | 1,400 |
| 16 | 8 | 8 | -------- | -------- | -------- | -------- | 1,320 | 1,375 | 1,365 |
| 16 | 12 | 4 | -------- | -------- | -------- | -------- | 1,375 | 1,365 | 1,400 |

[1] Code: A. "Drumulse 9169." This material is an example of a commercial lactylated fatty acid mono-diglyceride. It appears to be a mixture of glyceryl monopalmitin (alpha), glyceryl dipalmitin, glyceryl tripalmitin, glyceryl dilacto monopalmitin, glyceryl monolacto monopalmitin, and glyceryl monolacto dipalmitin. B. Lactylated mixed partial esters of glycerol and propylene glycol with saturated fatty acids derived from 1 I.V. soybean oil. C. Mono and diglycerides of saturated fatty acids derived from 1 I.V. cottonseed winter oil stearine. D. Mixed partial esters of glycerol and propylene glycol with saturated fatty acids derived from 1 I.V. soybean oil.
[2] Both these cakes have very dark wet crusts and wet crumb which is not normal for this type cake.

This example shows that a plastic shortening comprising 8% of the lactylated mixed higher fatty acid esters of glycerol and propylene gylcol (emulsifier B) in 85 I.V. soybean oil base stock gave an acceptable cake, while each of the other compositions tested gave poor results at this level. Higher levels of emulsifiers (A) and (B) in 85 I.V. soybean oil gave large cake volumes. However, the cakes containing emulsifier (A) had very dark wet crusts and wet crumb, which is an undersirable characteristic.

EXAMPLE 2

Samples similar to (B) and (D) in Table I above were prepared with 1 I.V. cottonseed winter oil stearine in place of the 1 I.V. soybean oil. These samples gave essentially the same baking results as those shown for (B) and (D) above.

EXAMPLE 3

A fluid shortening was prepared by blending 5% of the lactylated mixed esters prepared above with 110 I.V. soybean oil. The shortening had good fluidity and satisfactory baking characteristics.

While the invention has been described in terms of preferred embodiments thereof, it is to be understood that considerable variations in the detail disclosed may be made without departing from the true scope and spirit of the invention. Accordingly, the invention is to be limited only by the claims set forth hereinafter.

I claim:

1. A cake mix comprising flour, baking powder and sugar intimately blended with a shortening comprising: (a) from about 8 to 16% by weight of the shortening of a mixture of lactylated higher fatty acid esters of glycerol and lactylated higher fatty acid esters of propylene glycol, from about 10 to 90% by weight of said mixture being composed of lactylated propylene glycol higher fatty acid monoesters and (b) an edible triglyceride.

2. A cake mix comprising flour, baking powder and sugar intimately blended with a shortening comprising: (a) the reaction product of lactic acid and a mixture of the higher fatty acid esters of propylene glycol and the higher fatty acid esters of glycerol, from about 10 to 90% by weight of said reaction product being composed of propylene glycol higher fatty acid monoesters, (b) an emulsifier selected from the group consisting of edible mono-diglycerides and a mixture of the higher fatty acid esters of glycerol and the higher fatty acid esters of propylene glycol, and (c) an edible triglyceride the total amount of said reaction product (a) and emulsifier (b) in the shortening ranging from about 8 to 16% by weight thereof and the ratio of (a) to (b) being about 1:3 to 3:1.

3. A porcess which comprises (a) heating a higher fatty acid triglyceride with an excess amount of a mixture of glycerol and propylene glycol in the presence of an esterification catalyst until an interesterified mixture of glycerol esters and propylene glycol esters is produced, (b) removing excess polyhydric alcohol from the reaction mixture and (c) slowly adding lactic acid to said mixture of esters at elevated temperatures until at least some of the free OM groups in the esters are lactylated to provide a final mixture containing about 10 to 90% by weight of propylene glycol higher fatty acid monoesters.

4. A mixture comprising (a) the esterification product of lactic acid and higher fatty acid esters of glycerol and (b) the esterification product of lactic acid and higher fatty acid esters of propylene glycol, the hydroxyl groups of the lactic acid residues in the mixture being substantially unesterified and from about 10 to 90% by weight of the mixture being composed of lactylated higher fatty acid monoesters of propylene glycol.

5. The esterification product of lactic acid and a mixture of higher fatty acid esters of propylene glycol and higher fatty acid esters of glycerol, the hydroxyl groups of the lactic acid residues in said product being substantially unesterified and from about 10 to 90% by weight of the product being composed of lactylated propylene glycol higher fatty acid monoesters.

6. A shortening agent comprising an edible triglyceride and from about 8 to 16% by weight of the mixture of claim 4.

7. An emulsifier composition comprising: (a) the reaction product of lactic acid and a mixture of a higher fatty acid ester of propylene glycol and a higher fatty acid ester of glycerol, from about 10 to 90% by weight of said reaction product being composed of lactylated propylene glycol higher fatty acid monoesters and (b) an emulsifier selected from the group consisting of edible mono-diglycerides and a mixture of a higher fatty acid ester of gylcerol and a higher fatty acid ester of propylene glycol, the ratio of component (a) to component (b) ranging from about 1:3 to 3:1.

8. A shortening comprising an edible trigylceride in combination with from about 8 to 16% by weight of the emulsifier composition recited in claim 7.

References Cited in the file of this patent

UNITED STATES PATENTS

| | | |
|---|---|---|
| 2,329,166 | Tucker | Sept. 7, 1943 |
| 2,509,414 | Barsky | May 30, 1950 |
| 2,864,705 | Schluman | Dec. 16, 1958 |
| 2,874,051 | Bedenk et al. | Feb. 17, 1959 |
| 2,970,055 | Gleason | Jan. 31, 1961 |
| 2,978,329 | Cochrane et al. | Apr. 4, 1961 |
| 3,097,098 | Allen et al. | July 9, 1963 |

UNITED STATES PATENT OFFICE
CERTIFICATE OF CORRECTION

Patent No. 3,158,487                                November 24, 1964

Edward J. Reid

It is hereby certified that error appears in the above numbered patent requiring correction and that the said Letters Patent should read as corrected below.

Column 4, line 12, for "minutes:" read -- minutes. --; column 5, line 30, for "porcess" read -- process --; same column 5, line 38, for "OM" read -- OH --.

Signed and sealed this 6th day of April 1965.

(SEAL)
Attest:

ERNEST W. SWIDER
Attesting Officer

EDWARD J. BRENNER
Commissioner of Patents